United States Patent
Honda et al.

(10) Patent No.: US 9,742,232 B2
(45) Date of Patent: Aug. 22, 2017

(54) STATOR AND ELECTRIC PUMP (71) Applicant: Aisan Kogyo Kabushiki Kaisha, Obu-shi, Aichi-ken (JP)

(72) Inventors: Yoshihiko Honda, Obu (JP); Akira Hamajima, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 262 days.

(21) Appl. No.: 14/827,595

(22) Filed: Aug. 17, 2015

(65) Prior Publication Data
US 2016/0049840 A1   Feb. 18, 2016

(30) Foreign Application Priority Data

Aug. 18, 2014  (JP) ................. 2014-166083

(51) Int. Cl.
*H02K 3/28* (2006.01)
*H02K 3/52* (2006.01)

(52) U.S. Cl.
CPC .............. *H02K 3/28* (2013.01); *H02K 3/522* (2013.01); *H02K 2203/06* (2013.01); *H02K 2203/09* (2013.01)

(58) Field of Classification Search
CPC . H02K 3/522; H02K 2203/09; H02K 2203/06
See application file for complete search history.

(56) References Cited

U.S. PATENT DOCUMENTS

| 2,872,599 A * | 2/1959 | De Young ............. H02K 3/522 310/71 |
| 3,979,615 A * | 9/1976 | Neff ..................... H01R 4/2445 310/71 |
| 2006/0043806 A1 | 3/2006 | Torii et al. |
| 2010/0109457 A1* | 5/2010 | Sugiyama ............... H02K 3/50 310/71 |
| 2016/0333833 A1* | 11/2016 | Honda ................... F02M 37/10 |
| 2017/0141634 A1* | 5/2017 | Honda ..................... H02K 3/28 |

FOREIGN PATENT DOCUMENTS

| JP | 2006-067740 A | 3/2006 |
| JP | 2009-033847 A | 2/2009 |
| JP | 2012-075215 A | 4/2012 |

* cited by examiner

*Primary Examiner* — Mohamad Musleh
(74) *Attorney, Agent, or Firm* — Shumaker, Loop & Kendrick, LLP (57) ABSTRACT

A stator may comprise: a core having a tubular shape and comprising a tooth extending toward a central axis of the tubular shape; a conducting wire engaging part projecting from an axial end of the core in an axially outward direction from the core; and a coil disposed on the tooth by winding a conducting wire on the tooth. An end of the conducting wire may be bent at a bending portion. The conducting wire may engage with the conducting wire engaging part at the bending portion. A diameter of the conducting wire at the bending portion may be smaller than a diameter of the conducting wire at another portion of the conducting wire.

7 Claims, 7 Drawing Sheets

STATOR AND ELECTRIC PUMP

CROSS-REFERENCE TO RELATED APPLICATION

This application claims priority from Japanese Patent Application No. 2014-166083 filed on Aug. 18, 2014, the contents of which are hereby incorporated by reference into the present application.

TECHNICAL FIELD

The present invention relates to a stator used in a brushless motor.

DESCRIPTION OF RELATED ART

Japanese Patent Application Publication No. 2009-33847 discloses a brushless motor. The brushless motor includes a terminal part that is connected to an external component, a terminal bent in a polygonal shape, an electromagnetic coil formed by a conducting wire, and a connector coupled to the terminal. The terminal is coupled to one end of the terminal part. The terminal is disposed at an upper end of the electromagnetic coil. The conducting wire extending from the electromagnetic coil engages with the connector. Specifically, the conducting wire is bent at substantially 90° in the vicinity of the connector to engage with a hook part of the connector. The conducting wire is joined to the connector by electrodeposition.

SUMMARY

For a purpose of preventing a coil from loosening or preventing a conducting wire from warping, the conducting wire is placed under tension. For this reason, failure to appropriately retain the conducting wire may cause the conducting wire to move from its appropriate position.

The present specification provides a technology for preventing a conducting wire from moving from its appropriate position.

Disclosed herein is a stator to be used in a brushless motor. The stator may comprise: a core having a tubular shape and comprising a tooth extending toward a central axis of the tubular shape; a conducting wire engaging part projecting from an axial end of the core in an axially outward direction from the core; and a conducting wire wound on the tooth. The conducting wire may form a coil wound on the tooth. An end of the conducting wire may be bent at a bending portion. The conducting wire may engage with the conducting wire engaging part at the bending portion. A diameter of the conducting wire at the bending portion may be smaller than a diameter of the conducting wire at another portion of the conducting wire.

This configuration allows the conducting wire to be plastically deformed at the bending portion to be kept in a bent state. This suppresses deformation of the conducting wire at the bending portion even if the conducting wire is placed under tension, thereby the conducting wire and the conducting wire engaging part may be suppressed from disengaging from each other. This configuration prevents the conducting wire from disengaging from the conducting wire engaging part and moving from its appropriate position.

It should be noted that a brushless motor including the stator, and an electric pump including the stator are also novel and useful.

BRIEF DESCRIPTION OF DRAWINGS

These and other features, aspects and advantages of the present invention are better understood when the following detailed description of the invention is read with reference to the accompanying drawings, in which.

DETAILED DESCRIPTION

Some of the features characteristic to below-described embodiments will herein be listed. It should be noted that the respective technical elements are independent of one another, and are useful solely or in combinations. The combinations thereof are not limited to those described in the claims as originally filed.

(Feature 1) In a stator, a bending portion may have a bend radius that is smaller than a bend radius at which strain corresponding to 0.2% proof stress is exhibited in a conducting wire. This configuration makes it possible to suppress the conducting wire from being deformed at the bending portion, even if tension is applied. This in turn prevents the conducting wire from becoming unable to engage with the conducting wire engaging part.

(Feature 2) In the stator, a portion of the conducting wire located between the bending portion and the coil may be placed in a skew position with respect to a portion of the conducting wire located closer to an end side than the bending portion. This configuration prevents the bending portion from deforming under conducting wire tension that is applied to a portion of the conducting wire located between the bending portion and the coil.

(Feature 3) In the stator, the conducting wire engaging part may comprise a guide groove configured to guide at least one of a portion of the conducting wire located between the bending portion and the coil and a portion of the conducting wire located closer to an end side of the conducting wire than the bending portion. This configuration makes it possible to suppress the conducting wire from running off the conducting wire guide groove and deforming while the conducting wire is being guided by the guide groove.

(Feature 4) The stator may further comprise a terminal member facing the conducting wire engaging part with an interval in between. At least one of a portion of the conducting wire located between the bending portion and the coil and a portion of the conducting wire located closer to an end side of the conducting wire than the bending portion may pass through an interval between the conducting wire engaging part and the terminal member. A length of the conducting wire that extends from the bending portion to an end of the conducting wire may be longer than the interval between the conducting wire engaging part and the terminal member. This configuration prevents a portion of the conducting wire that extends from the bending portion to the end of the conducting wire from passing through the interval between the conducting wire engaging part and the terminal member even if the conducting wire deforms at the bending portion. This in turn makes it possible to suppress the conducting wire from moving at the bending portion.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved stators and electric pumps, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENT

Figure 1:
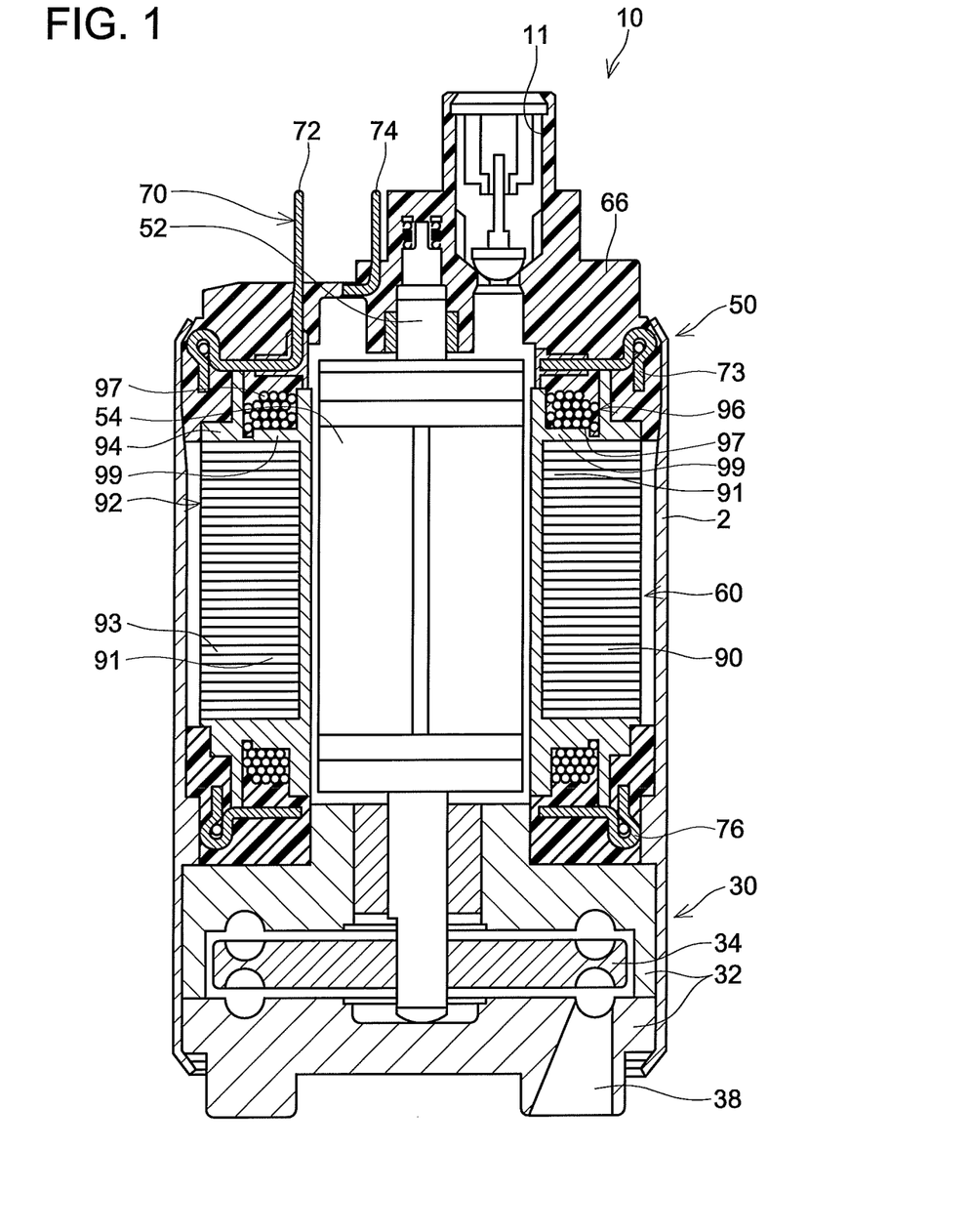
FIG. 1 shows a longitudinal cross-sectional view of a fuel pump.

As shown in FIG. 1, a stator 60 according to the present embodiment is used in a fuel pump 10. The fuel pump 10 is disposed in a fuel tank (not shown). The fuel pump 10 supplies fuel (such as gasoline) to an engine (not shown) of a vehicle such as an automobile. The fuel pump 10 comprises a motor portion 50 and a pump portion 30. The motor portion 50 and the pump portion 30 are disposed in a housing 2. The housing 2 has a tubular shape with both ends opened.

The pump portion 30 comprises a casing 32 and an impeller 34. The casing 32 closes an opening of a lower edge of the housing 2. At the lower edge of the casing 32, an intake port 38 is provided. At an upper edge of the casing 32, a through-hole (not shown) for communicating between an inside of the casing 32 and the motor portion 50 is provided. The impeller 34 is provided within the casing 32.

The motor portion 50 is positioned above the pump portion 30. The motor portion 50 is a brushless motor. The motor portion 50 is a three-phase motor. The motor portion 50 comprises a rotor 54 and a stator 60. The rotor 54 comprises a permanent magnet. At a center of the rotor 54, a shaft 52 is fixed by penetrating the rotor 54. A lower edge of the shaft 52 is inserted into a center portion of the impeller 34, and penetrates the impeller 34. The rotor 54 is rotatably supported around the shaft 52 by bearings disposed at both edge portions of the shaft 52. In the embodiment, above and below are stipulated in a state of FIG. 1. That is, the pump portion 30 is positioned "below", viewed from the motor portion 50, and the motor portion 50 is positioned "above", viewed from the pump portion 30.

The stator 60 is covered by a resin layer 66. The resin layer 66 closes an opening at the upper edge of the housing 2. At the upper edge of the resin layer 66, a discharge port 11 is provided. The discharge port 11 establishes a communicated state between the motor portion 50 and a fuel path outside the fuel pump 10. The discharge port 11 is an opening for discharging the fuel boosted by the pump portion 30 to the fuel path. A portion covering the stator 60 and the discharge port 11 is integrally formed. The portion covering the stator 60 and the discharge port 11 may also be provided separately from each other.

The stator 60 includes a core 90, a plurality of (in the present embodiment, six) coils 96 disposed in the core 90, and a terminal group 70. The core 90 includes a core plate group (92, 92, . . . ) and an insulator 94 provided on a surface of the core plate group (92, 92, . . . ). The core plate group (92, 92, . . . ) includes a plurality of core plates 92. It should be noted that in preference to viewability, FIG. 1 omits hatching that represents cross-sections of the plurality of core plates 92. The plurality of core plates 92 is vertically stacked on top of each other. Each of the core plates 92 is made of a magnetic material. The core plate group (92, 92, . . . ) includes a tubular yoke 93 and a plurality of teeth 91. The yoke 93 configures a side wall of the stator 60. The plurality of teeth 91 extends from an inner circumferential surface of the yoke 93 toward a central axis of the yoke 93. The insulator 94 is made of an insulating resin material. The insulator 94 covers a surface of the core plate group (92, 92, . . . ) constituted by the plurality of core plates 92 stacked on top of each other.

Figure 2:
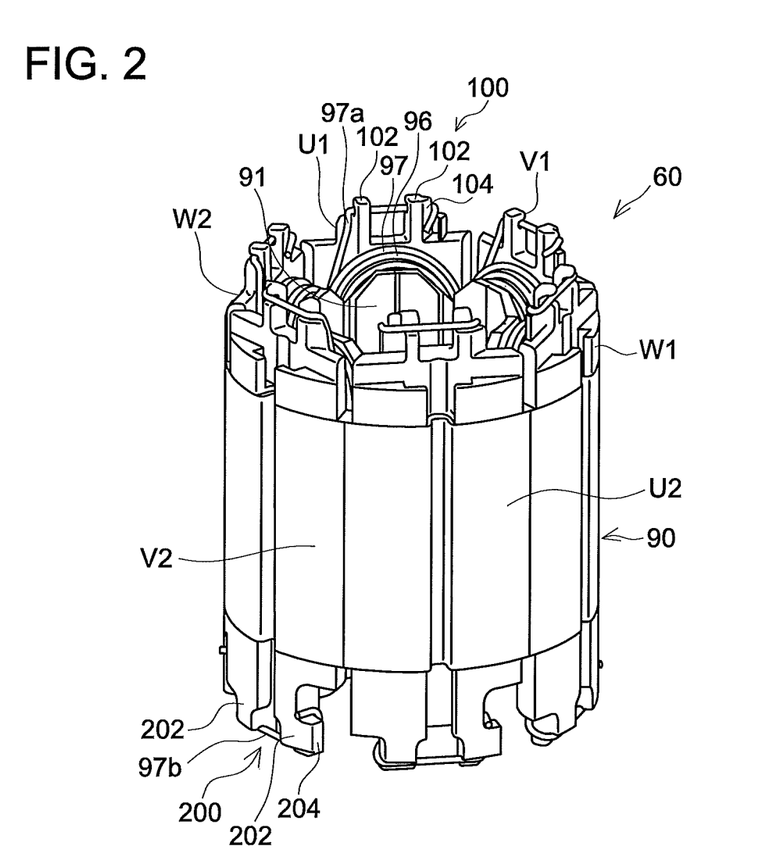
FIG. 2 shows a perspective view of a core.

As shown in FIG. 2, the core 90 includes six partial cores U1, V1, W1, U2, V2, and W2. The six partial cores U1 to W2 are disposed in a tubular shape. The six partial cores U1 to W2 include two U-phase partial cores U1 and U2, two V-phase partial cores V1 and V2, and two W-phase partial cores W1 and W2. Since the partial cores U1 to W2 are substantially identical in configuration to each other, the partial core U1 is described as a representative example. FIG. 2 and the other drawings omit to show any of the core plates 92 of the core plate group (92, 92, . . . ), although the core plate group (92, 92, . . . ) is exposed on a side surface of the core 90.

Figure 4:
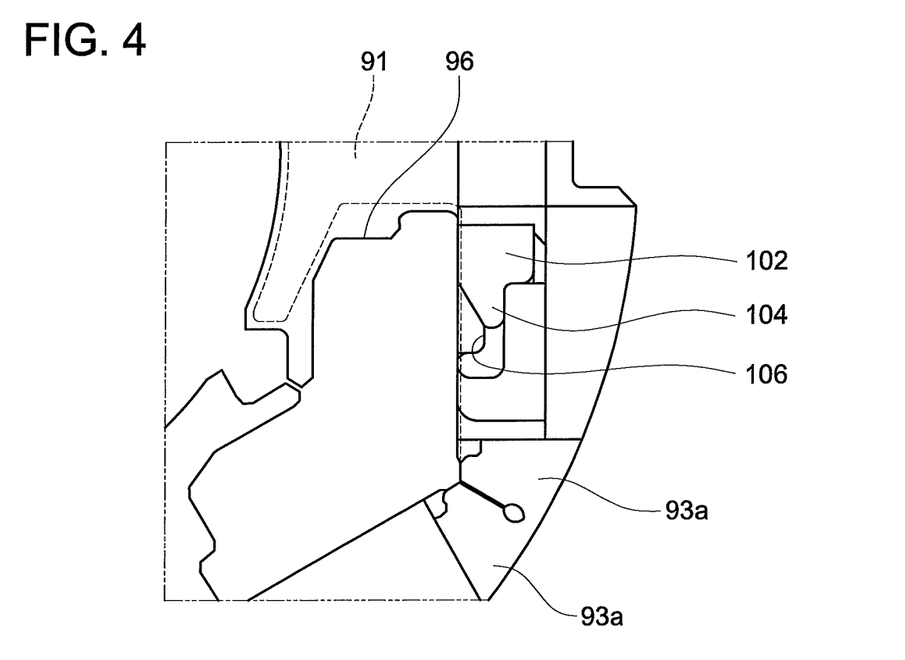
FIG. 4 shows an upper view of a conducting wire end side of the conducting wire engaging part of the upper end side of the core.

The partial core U1 includes a partial yoke 93a, a tooth 91, a bobbin 99 (see FIG. 4), and conducting wire engaging parts 100 and 200. As shown in FIG. 4, the partial yoke 93a is a part of the yoke 93 and is located on the outermost circumferential side of the partial core U1. It should be noted that the yoke 93 is constituted by six partial yokes 93a of the partial cores U1 to W2. The partial yoke 93a has an outer circumferential surface having a partially tubular shape. The partial yoke 93a has an inner circumferential surface having a plate shape. The partial yoke 93a abuts against the respective partial yokes 93a of the adjacent partial cores W2 and V1. The six partial cores U1 to W2 are coupled to each other at their respective partial yokes 93a to form a tubular shape.

The tooth 91, which extends toward a central axis of the stator 60 (i.e. a central axis of the shaft 52), is disposed in a center portion of the partial yoke 93a. The tooth 91 is constituted by a portion of the core plate 92 that projects from the partial yoke 93a toward an inner circumferential side of the partial yoke 93a. The six teeth 91 of the six partial cores U1 to W2 are placed at regular intervals in a circumferential direction of the partial yokes 93a. The tooth 91 has an inner circumferential end portion extending in the circumferential direction of the partial yoke 93a and having a shape in conformance with an outer circumferential surface of the rotor 54 having a column shape. The tooth 91 is covered by the insulator 94. The tooth 91 has its inner circumferential side end covered by the insulator 94.

The bobbin 99 and the conducting wire engaging parts 100 and 200 are formed by the insulator 94. It should be noted that FIG. 2 gives the reference sign to the conducting wire engaging part 200 of the partial core V2 as the conducting wire engaging part 200 of the partial core U1 cannot be seen. The bobbin 99 is constituted by a portion of the insulator 94 that covers the tooth 91 and a portion of the insulator 94 that covers the inner circumferential surface of the partial yoke 93a. The bobbin 99 encircles a side surface of the tooth 91.

A coil 96 is disposed on the bobbin 99. The coil 96 is made with a conducting wire 97 wound around the bobbin 99. The coil 96 is electrically connected to the terminal group 70. The coil 96 of the partial core U1 is connected to the coil 96 of the partial core U2, and potentials of the same phase are supplied to the coil 96 of the partial core U1 and the coil 96 of the partial core U2. Similarly, the coil 96 of the partial core V1 is connected to the coil 96 of the partial core V2, and potentials of the same phase are supplied to the coil 96 of the partial core V1 and the coil 96 of the partial core V2. Furthermore, similarly, the coil 96 of the partial core W1 is connected to the coil 96 of the partial core W2, and potentials of the same phase are supplied to the coil 96 of the partial core W1 and the coil 96 of the partial core W2.

Figure 3:
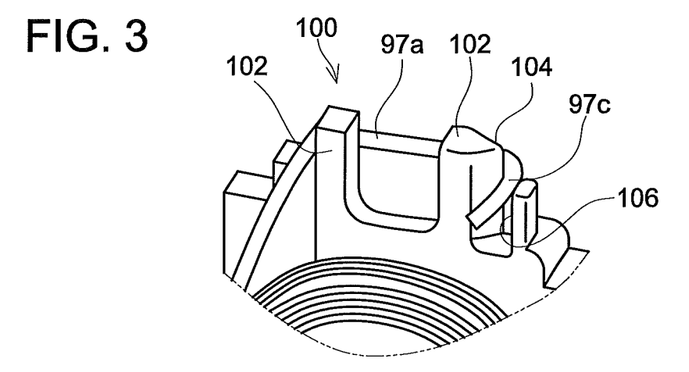
FIG. 3 shows an enlarged perspective view of a conducting wire engaging part of an upper end side of the core.
Figure 5:
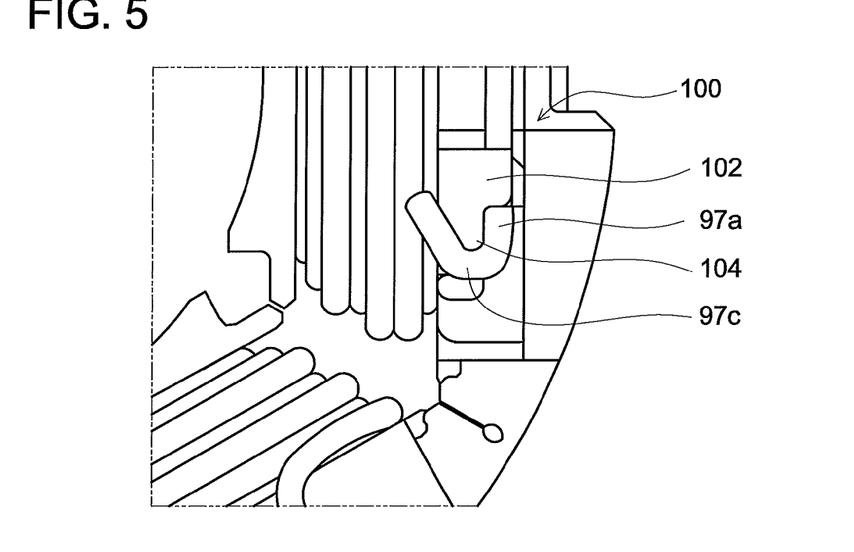
FIG. 5 shows an upper view of a conducting wire end side of the conducting wire engaging part after a coil is wound.
Figure 6:
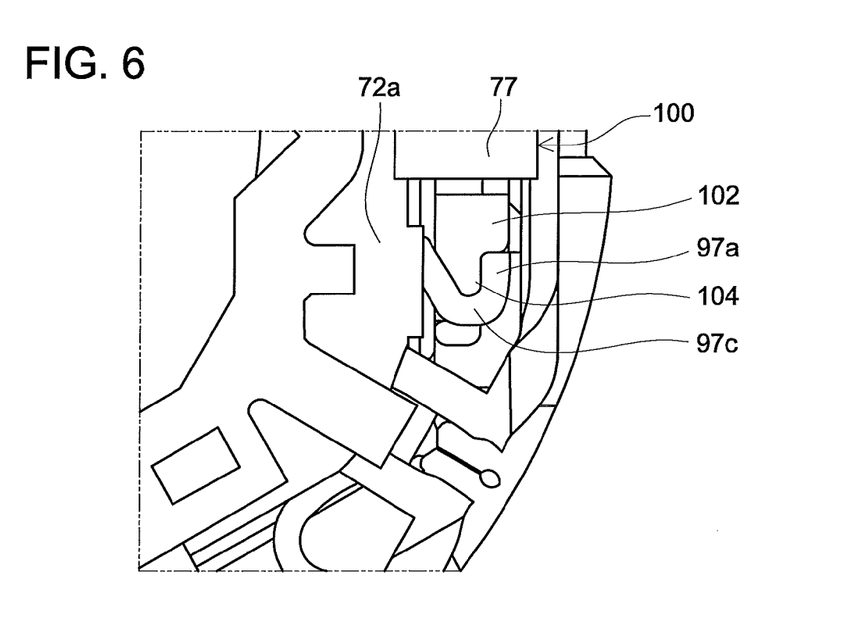
FIG. 6 shows an upper view of a conducting wire end side of the conducting wire engaging part after a terminal portion is attached.

The conducting wire 97, which forms the coil 96, has ends extending upward and downward from the coil 96, respectively. The conducting wire 97 includes a conducting wire 97a extending to a higher position than the bobbin 99. The conducting wire 97a is supported by the conducting wire engaging part 100. As shown in FIG. 3, the conducting wire engaging part 100 includes two supports 102, an engaging part 104, and a guide groove 106. It should be noted that FIG. 3 partially shows an upper end of the partial core U1 and an area around the upper end. The two supports 102 are located at an upper end of the insulator 94. The two supports 102 are placed at an interval from each other. The two supports 102 place the conducting wire 97a in a tension state. The conducting wire 97a supported by the two supports 102 has an end engaging with the engaging part 104. The engaging part 104 is disposed on a side surface of one of the supports 102 (i.e. the support 102 located on a side opposite to a side on which the conducting wire 97a extends toward the coil 96). The engaging part 104 projects toward a side opposite to the support 102 to form an acute angle. As shown in FIG. 4, a radius of a tip of the engaging part 104 is smaller than a bend radius (see FIG. 11, which will be described later) at which the conducting wire 97 strains under 0.2% proof stress. It should be noted that FIG. 4 partially shows the engaging part 104 of the partial core U1 and an area around the engaging part 104. FIGS. 5 and 6, which will be described later, show parts which correspond to that shown in FIG. 4. The guide groove 106 is disposed on a side of the engaging part 104 on the inner circumference of the stator 60. The guide groove 106 guides the end of the conducting wire 97a. The guide groove 106 extends downward.

Figure 8:
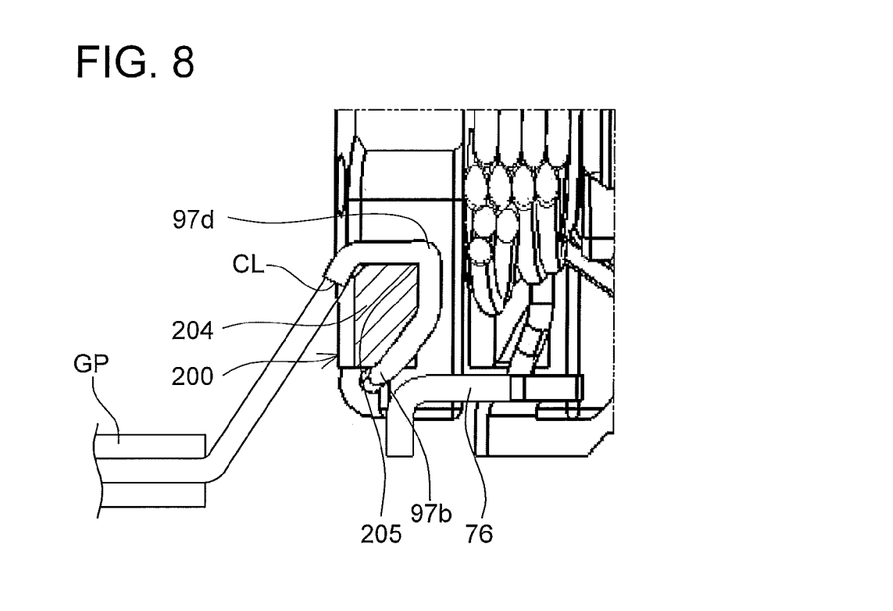
FIG. 8 shows a side view of a conducting wire end side of the conducting wire engaging part of a lower end side of the core.

The conducting wire 97 includes a conducting wire 97b extending downward from the coil 96. The conducting wire 97b is supported by the conducting wire engaging part 200. The conducting wire engaging part 200 includes two supports 202, an engaging part 204, and a guide groove 206 (see FIG. 9). The two supports 202 are located at a lower end of the insulator 94. The two supports 202 are placed at an interval from each other. The two supports 202 place the conducting wire 97b in a tension state. The conducting wire 97b supported by the two supports 202 has an end engaging with the engaging part 204. The engaging part 204 is disposed on a side surface of one of the supports 202 (i.e. the support 202 located on a side opposite to a side on which the conducting wire 97b extends toward the coil 96). As shown in FIG. 8, the engaging part 204 includes a reforming part 205. It should be noted that FIG. 8 shows a cross-section of the engaging part 204 on a plane including an axis of the conducting wire 97b disposed along the engaging part 204. The reforming part 205 is shaped so that when the conducting wire 97b is disposed along the engaging part 204, the conducting wire 97b is deformed so that its bend radius becomes smaller than a bend radius (see FIG. 11, which will be described later) at which strain corresponding to 0.2% proof stress is exhibited in the conducting wire 97.

Figure 9:
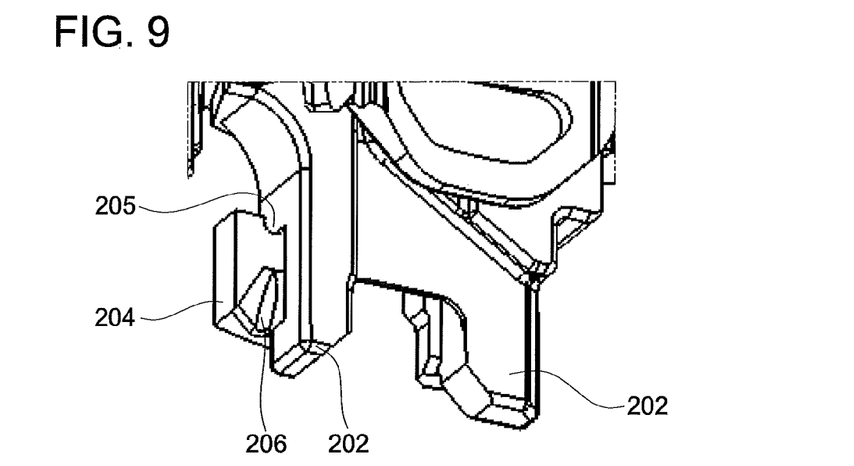
FIG. 9 shows an enlarged perspective view of a conducting wire engaging part of the lower end side of the core.

As shown in FIG. 9, the guide groove 206 is disposed at a position close to the end of the conducting wire 97b in a portion of the engaging part 204 below the reforming part 205. The guide groove 206 guides the end of the conducting wire 97b. It should be noted that FIG. 9 partially shows a lower end of the partial core U1. The guide groove 206 extends upward.

Figure 7:
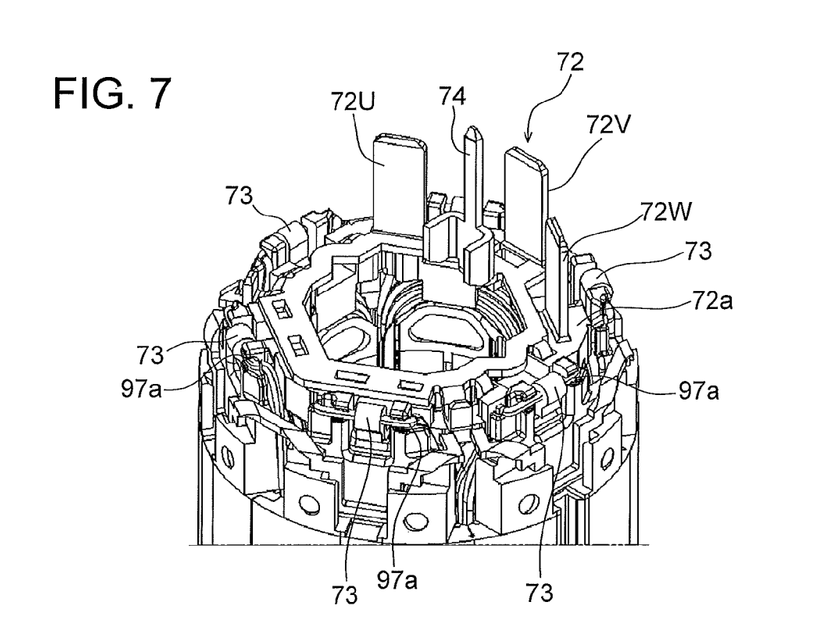
FIG. 7 shows a perspective view of an upper part of a stator.

The following will describe how the coil 96 and the terminal group 70 are connected to each other. As shown in FIG. 7, the coil 96 is electrically connected to an input terminal 72 of the terminal group 70 via the conducting wire 97a at an upper end of the stator 60. It should be noted that FIG. 7 partially shows the upper end of the stator 60. The input terminal 72 is a terminal configured to supply a U phase, a V phase, and a W phase to the coils 96, respectively. The input terminal 72 includes three terminal parts 72U, 72V, and 72W. The terminal parts 72U, 72V, and 72W correspond to the U phase, the V phase, and the W phase, respectively. The terminal parts 72U, 72V, and 72W are coupled to each other while being insulated from each other by a terminal block 72a made of resin. The terminal part 72U includes, for each of the partial cores U1 and U2, an abutting part 73 that abuts against the conducting wire 97a placed in a tension state by the two supports 102. This allows the terminal part 72U to make an electrical connection between the coils 96 wound around the partial cores U1 and U2, respectively. Similarly, each of the terminal parts 72V and 72W include two abutting parts 73. This allows the terminal part 72V to make an electrical connection between the coils 96 wound around the partial cores V1 and V2, respectively, and the terminal part 72W to make an electrical connection between the coils 96 wound around the partial cores W1 and W2, respectively.

It should be noted that, as shown in FIG. 7, a grounding terminal 74 is disposed on an inner circumferential side of the input terminal 72. The grounding terminal 74 is a terminal configured to prevent electrolytic corrosion of an inside of the fuel pump 10. The grounding terminal 74 grounds a component (e.g. a bearing) in the fuel pump 10 that should be prevented from undergoing electrolytic corrosion.

Figure 10:
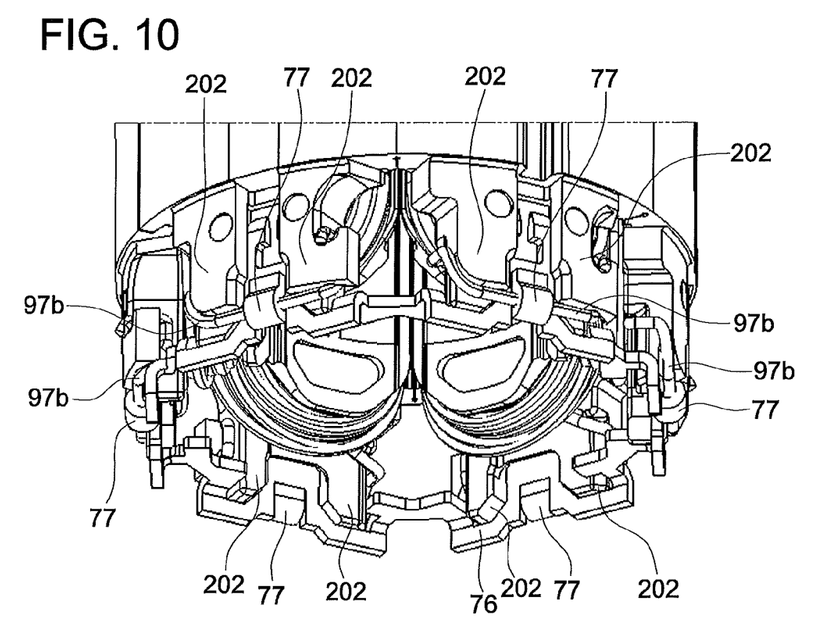
FIG. 10 shows a perspective view of a lower end of the stator.

Further, as shown in FIG. 10, the coil 96 is electrically connected to a common terminal 76 of the terminal group 70 via the conducting wire 97b at a lower end of the stator 60. It should be noted that FIG. 10 partially shows the lower end of the stator 60. The common terminal 76 is a terminal configured to make an electrical connection between the coils 96 of the U phase, the V phase, and the W phase. The common terminal 76 includes an abutting part 77 that abuts against the conducting wire 97b placed in a tension state by the two supports 202 of each of the partial cores U1 to W2. This allows the common terminal 76 to be electrically connected to the six coils 96.

Method for Winding the Conducting Wire

The following will describe a method for making the coil 96 by winding the conducting wire 97 in the partial core U1. The conducting wire 97 is wound in a state where the partial cores U1 to W2 are coupled to their adjacent partial cores at the partial yokes 93a and arranged in a linear fashion. First, as shown in FIG. 8, the end of the conducting wire 97 is disposed along the engaging part 204 disposed at the lower end of the partial core U1. It should be noted that FIG. 8 partially shows the engaging part 204 and an area around the engaging part 204. It should be noted that while the conducting wire 97 is being wound, the end of the conduction wire 97 is held by a grip GP of a conducting wire winding machine, and after the conducting wire 97 has been wound, the end of the conducting wire 97 is cut off at a cutting position CL. The conducting wire 97 is disposed along an upper surface of the engaging part 204 and bent downward by the reforming part 205. The conducting wire 97 includes a bending portion 97d at which the conducting wire 97 is bent by the reforming part 205, and the bending portion 97d has a bend radius that is smaller than the bend radius at which the strain corresponding to 0.2% proof stress is exhibited in the conducting wire 97. For example, in a case where the conducting wire 97 has a diameter of 0.7 mm, the bending portion 97d has the bend radius (i.e. a radius on the axis of the conducting wire 97) of approximately 1.5 mm or smaller. The radius of the conducting wire 97 at the bending portion 97d is smaller than the radius of the conducting wire 97 at another portion of the conducting wire 97, in particular the radius of the conducting wire 97 at portions around the bending portion 97d. The conducting wire 97 is arranged downward from the bending portion 97d along the guide groove 206 (see FIG. 9). Then, the conducting wire 97 is bent to be in a skew position with respect to a portion of the conducting wire 97 disposed on the engaging part 204 (i.e. in a direction from the near side of FIG. 8 to the far side of FIG. 8), and is placed in a tension state by the two supports 202.

Next, the conducting wire 97 extends from one of the supports 202 toward the bobbin 99 and is wound around the bobbin 99 to make the coil 96. Once the coil 96 is made, the conducting wire 97 is routed to the upper end of the partial core U1 and is placed in a tension state by the two supports 102. Furthermore, as shown in FIG. 5, the conducting wire 97 is bent along the engaging part 104 at an end portion of the conducting wire 97. The conducting wire 97 includes a bending portion 97c at which the conducting wire 97 is bent by the engaging part 104, and the bending portion 97c has a bend radius that is smaller than the bend radius at which the strain corresponding to 0.2% proof stress is exhibited in the conducting wire 97. The radius of the conducting wire 97 at the bending portion 97c is smaller than the radius of the conducting wire 97 at another portion of the conducting wire 97, in particular the radius of the conducting wire 97 at portions around the bending portion 97c. In other words, the radius of the conducting wire 97 at the bending portion 97c is smaller than the radius of the portion of the conducting wire 97 on at least one side of the bending portion 97c.

While being placed in a tension state by the supports 102, the conducting wire 97 bent at the bending portion 97c is bent downward to a position where the conducting wire 97 is guided into the guide groove 106. That is, the conducting wire 97 is placed in a skew position across the bending portion 97c as shown in FIG. 3. This causes the coil 96 to be made and the conducting wire 97 to be attached to the partial core U1. The coils 96 of the partial cores U2 to W2 are made in a manner similar to that in which the coil 96 of the partial core U1 is made, and the conducting wires 97 of the partial cores U2 to W2 are disposed in a manner similar to that in which the conducting wire 97 of the partial core U1 is disposed.

Figure 11:
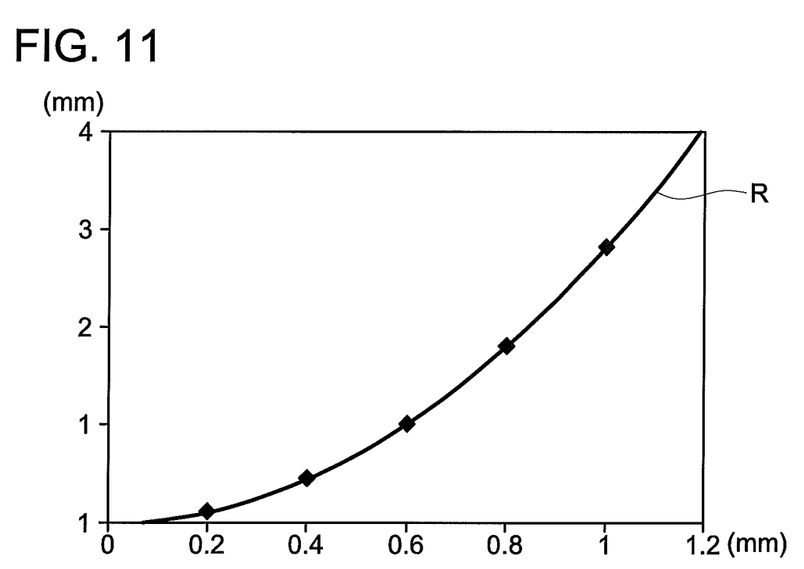
FIG. 11 shows a graph showing a relationship between a diameter of the conducting wire and a bend radius at which a strain corresponding to 0.2% proof stress is exhibited in the conducting wire.

FIG. 11 is a graph showing a relationship between a diameter of the conducting wire 97 and the bend radius at which the strain corresponding to 0.2% proof stress is exhibited in the conducting wire 97. In the graph of FIG. 11, a vertical axis represents the bend radius at which the strain corresponding to 0.2% proof stress is exhibited in the conducting wire 97, and a horizontal axis represents the diameter of the conducting wire 97. It should be noted that the conducting wire 97 is made of a copper alloy. The conducting wire 97 is bent so that the bend radii of the conducting wire 97 at the bending portions 97c and 97d, respectively, are smaller than a bend radius R. In FIG. 11, the bend radius R can be expressed as $y=2.8125x^2$, in a case where the vertical axis is y and the horizontal axis is x.

Once the coil 96 is made, the input terminal 72 and the grounding terminal 74 are attached to the upper end of the core 90 as shown in FIG. 7. As shown in FIG. 6, the terminal block 72a of the input terminal 72 is placed at an interval from the conducting wire engaging part 100 (more particularly the supports 102). The interval between the terminal block 72a and the conducting wire engaging part 100 (i.e., the support 102) is shorter than a length of a portion of the conducting wire 97 that is closer to the end side of the conducting wire 97 than the bending portion 97c of the conducting wire 97 (i.e. a portion of the conducting wire 97 that is on the left side of the bending portion 97c in FIG. 6). This configuration enables a portion of the conducting wire 97 that extends from the bending portion 97c to the end to abut against the terminal block 72a and avoid passing through the interval between the conducting wire engaging part 100 and the terminal block 72a, even if the conducting wire 97 is to deform at the bending portion 97c. This makes it possible to suppress the conducting wire 97 from deforming at the bending portion 97c. Then, the conducting wire 97a located between the two supports 102 and the abutting part 73 are welded to each other. This enables the input terminal 72 and the conducting wire 97 to be electrically connected to each other.

As shown in FIG. 10, the common terminal 76 is attached to a lower end of the core 90. As shown in FIG. 8, the common terminal 76 is placed at an interval from the conducting wire engaging part 200, particularly the engaging part 204. The interval between the common terminal 76 and the conducting wire engaging part 200 (i.e., the engaging part 204) is shorter than a length of a portion of the conducting wire 97 that is closer to the end side of the conducting wire 97 than the bending portion 97*d* of the conducting wire 97 (i.e. a portion of the conducting wire 97 that is on the left side of the bending portion 97*d* in FIG. 8). This configuration prevents a portion of the conducting wire 97 that extends from the bending portion 97*d* to the end from passing through the interval between the conducting wire engaging part 200 and the common terminal 76, even if the conducting wire 97 is to deform at the bending portion 97*d*. This makes it possible to suppress the conducting wire 97 from deforming at the bending portion 97*d*.

Effects of the Present Embodiment

In the present embodiment, the conducting wire 97 is bent by plastic deformation at the bending portions 97*c* and 97*d* so that the radius of the conducting wire 97 becomes smaller. In this configuration, the conducting wire 97 is kept in a bent state at the bending portions 97*c* and 97*d*. This suppresses deformation of the conducting wire 97 at the bending portions 97*c* and 97*d* even if the conducting wire 97 is placed under tension, thereby making it possible to suppress the conducting wire 97 and the conducting wire engaging parts 100 and 200 from disengaging from each other. This configuration prevents the conducting wire 97 from moving from its appropriate position.

Further, at the bending portions 97*c* and 97*d*, the conducting wire 97 has a bend radius that is smaller than a bend radius at which the strain corresponding to 0.2% proof stress is exhibited in the conducting wire 97. This configuration enables the conducting wire 97 to avoid deforming at the bending portions 97*c* and 97*d* to become unable to engage with the conducting wire engaging parts 100 and 200.

Portions of the conducting wire 97 that precede and follow the bending portions 97*c* and 97*d*, respectively, are placed in a skew position. This configuration prevents the bending portions 97*c* and 97*d* from deforming under tension applied in an axial direction of the conducting wire 97 to a portion of the conducting wire 97 located closer to the coil 96 than the bending portions 97*c* and 97*d*.

The conducting wire 97 is guided by the guide grooves 106 and 206. This configuration makes it possible to suppress the conducting wire 97 from running off the guide grooves 106 and 206 and deforming by being guided by the guide grooves 106 and 206.

(1) The embodiment described above is an example where the stator 60 is used in the fuel pump 10. Alternatively, the stator 60 disclosed herein may be used in an electric pump such as a cooling water pump or in another apparatus.

(2) In the embodiment described above, the conducting wire engaging parts 100 and 200 are different in shape from each other. Alternatively, the conducting wire engaging parts 100 and 200 may be identical in shape to each other. Alternatively, the conducting wire engaging part 100 may be disposed at the lower end of the stator 60, and the conducting wire engaging part 200 may be disposed at the upper end of the stator 60.

What is claimed is:

1. A stator o be used in a brushless motor, the stator comprising:
    a core having a tubular shape and comprising a tooth extending toward a central axis of the tubular shape;
    a conducting wire engaging part projecting from an axial end of the core in an axially outward direction from the core; and
    a conducting wire wound on the tooth, wherein
        the conducting wire forms a coil wound on the tooth,
        an end of the conducting wire is bent at a bending portion,
        the conducting wire engages with the conducting wire engaging part at the bending portion, and
        a diameter of the conducting wire at the bending portion is smaller than a diameter of the conducting wire at another portion of the conducting wire.

2. The stator according to claim 1, wherein the bending portion has a bend radius that is smaller than a bend radius at which strain corresponding to 0.2% proof stress is exhibited in the conducting wire.

3. The stator according to claim 1, wherein a portion of the conducting wire located between the bending portion and the coil is placed in a skew position with respect to a portion of the conducting wire located closer to an end side of the conducting wire than the bending portion.

4. The stator according to claim 1, wherein the conducting wire engaging part comprises a guide groove configured to guide at least one of a portion of the conducting wire located between the bending portion and the coil and a portion of the conducting wire located closer to an end side of the conducting wire than the bending portion.

5. The stator according to claim 1, further comprising:
    a terminal member facing the conducting wire engaging part with an interval in between,
    wherein at least one of a portion of the conducting wire located between the bending portion and the coil and a portion of the conducting wire located closer to an end side of the conducting wire than the bending portion passes through an interval between the conducting wire engaging part and the terminal member, and
    a length of the conducting wire that extends from the bending portion to an end of the conducting wire is longer than the interval between the conducting wire engaging part and the terminal member.

6. The stator according to claim 1, further comprising:
    a plurality of the conducting wire engaging parts; and
    a plurality of the conducting wires,
    wherein the core includes a plurality of the teeth, and
    each of the conducting wire forms a coil wound on the corresponding tooth, and engages with the corresponding conducting wire engaging part.

7. An electric pump comprising a brushless motor comprising the stator according to claim 1.

* * * * *